Nov. 12, 1940.    B. M. LANG    2,221,143
SYSTEM AND APPARATUS FOR PIANO INSTRUCTION
Filed Dec. 5, 1938    2 Sheets-Sheet 1
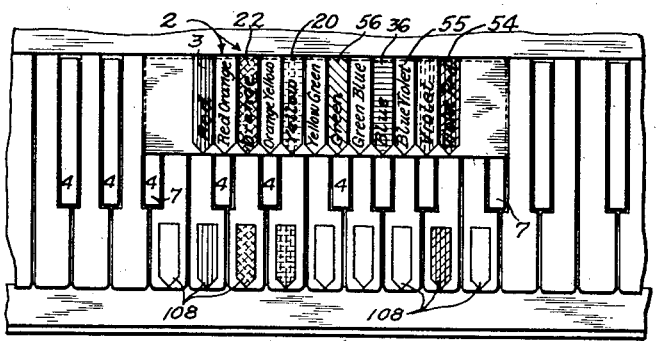
Fig. 1
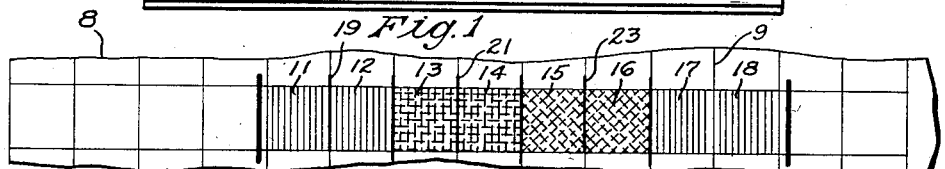
Fig. 4
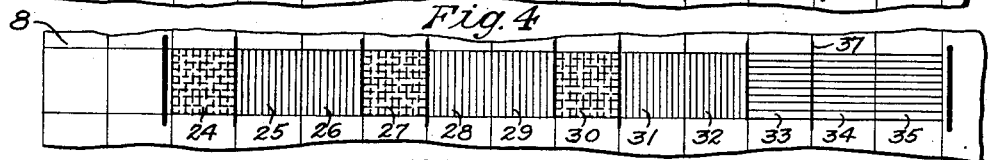
Fig. 5
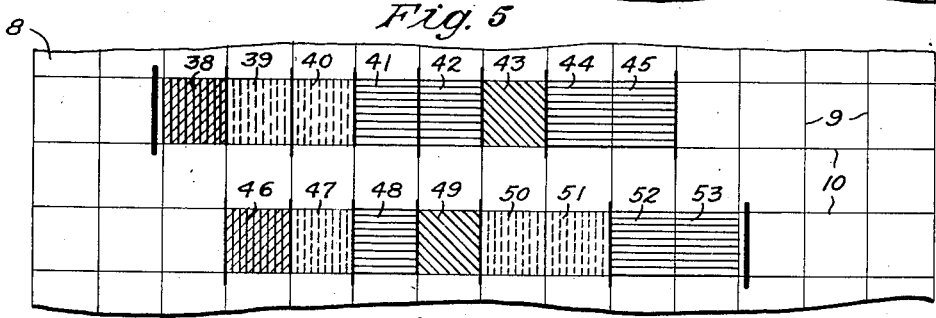
Fig. 6
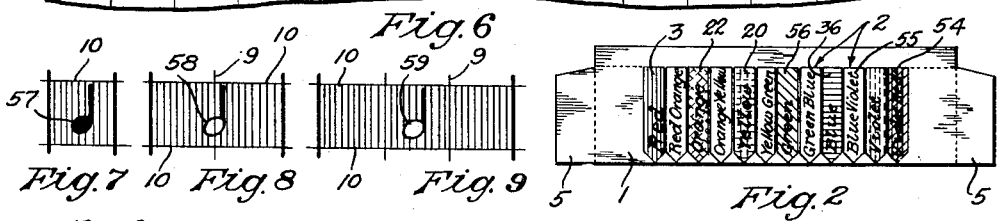
Fig. 7    Fig. 8    Fig. 9    Fig. 2
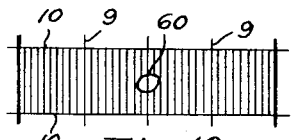    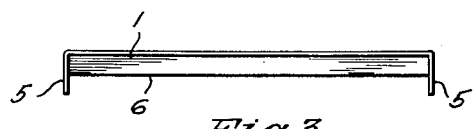
Fig. 10    Fig. 3
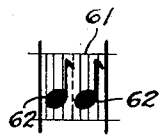    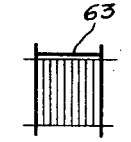        
Fig. 11    Fig. 12    Fig. 13    Fig. 14
INVENTOR
Boris M. Lang
BY Wooster & Davis
ATTORNEYS Nov. 12, 1940.  B. M. LANG  2,221,143

SYSTEM AND APPARATUS FOR PIANO INSTRUCTION

Filed Dec. 5, 1938  2 Sheets-Sheet 2

INVENTOR
Boris M. Lang
BY
Wooster & Davis
ATTORNEYS.

Patented Nov. 12, 1940

2,221,143

UNITED STATES PATENT OFFICE 2,221,143

SYSTEM AND APPARATUS FOR PIANO INSTRUCTION

Boris M. Lang, Westport, Conn.

Application December 5, 1938, Serial No. 243,989

2 Claims. (Cl. 84—478)

This invention relates to a system and apparatus for piano instruction and has for an object to provide a system and means of indicating the musical notes and proper keys on the piano for playing them by means of a series of colors so that even a very young child may play simple pieces without being required to learn to read music.

It is also an object to provide a system and means of teaching music which will appeal to the pupil more in the nature of a game than as a lesson or the drudgery usually associated by children with music lessons, and yet will give them an independent natural knowledge of music, as tone, rhythm, harmony, knowledge of the piano keyboard, notes, etc.

With the foregoing and other objects in view I have devised the system and means for using it illustrated in the accompanying drawings forming a part of this specification. It is to be understood that these illustrations are examples to explain the system and how it may be used, and that I am not limited to the specific means shown but various changes and modifications may be employed within the scope of the invention.

In these drawings:

Fig. 1 is a plan view of a portion of a piano keyboard showing the indicator element of this apparatus in position thereon;

Fig. 2 is a plan view of the indicator removed from the keyboard and showing the securing flaps in the plane of the body of the indicator;

Fig. 3 is a front view of this indicator with the flaps in the position of use;

Fig. 4 is a view of a portion of a chart showing how a simple piece of music is indicated and which is used with the indicator to show what keys are to be played in playing this piece;

Fig. 5 is a similar view showing a somewhat more elaborate piece to be played;

Fig. 6 is a similar view showing a still more elaborate piece;

Figs. 7, 8, 9, 10 and 11 are views showing how different notes may be indicated;

Figs. 12, 13 and 14 are to show a simple means for indicating how a note is to be played in a higher or lower octave;

Figure 15:
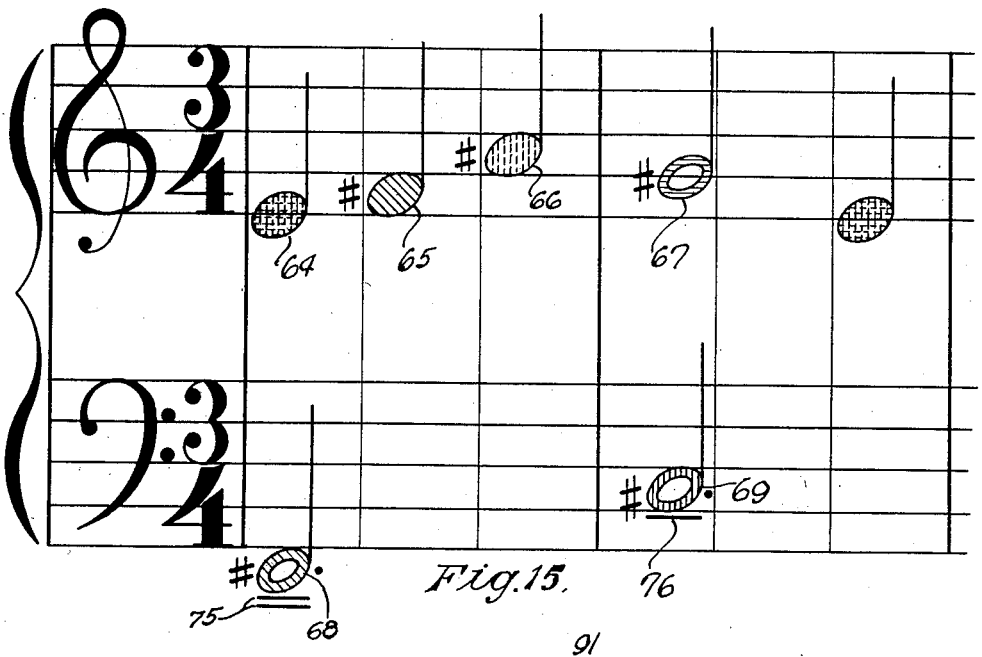
Fig. 15 is a diagram chart for more advanced pupils showing how the same method may be employed for indicating the notes.

This system and apparatus comprises one or more indicators to be placed on or adjacent the keyboard of a piano and having thereon a series of differently colored indicators arranged in alignment with the proper keys on the keyboard, and used in combination with a chart having a series of differently colored blocks or other indications arranged to indicate notes to be played corresponding to the colors on the indicator at the piano keyboard, so that in playing a piece a child merely plays the keys opposite the color indications on the indicator corresponding with the similarly colored blocks or indications on the chart.

The indicator may be of various constructions but a simple and effective one is shown in Figs. 1, 2 and 3 comprising a body 1 of cardboard or similar material of elongated rectangular shape or strip having on its upper surface a series of indications 2 of different colors positioned to correspond with the spacing of the keys of the piano keyboard. Thus in the form shown these indications comprise a plurality of elongated panels or substantial rectangles lying side by side and pointed at the forward end to overlie the proper keys on the keyboard. The colors may be arranged in any way desired but it is preferred to arrange them in the order in which they occur in the natural spectrum. Thus as indicated the panels are colored, beginning at the left hand end of the indicator and moving to the right, in the following order, red, red orange, orange, orange yellow, yellow, yellow green, green, green blue, blue, blue violet, violet, and violet red, and when this indicator is placed on the keyboard of the piano as indicated in Fig. 1 with the red panel 3 over or in alignment with the key corresponding with the note C the other panels will be in alignment with the keys immediately to the right of this key including both the white keys and the black keys indicated generally at 4. The body member 1 has at its opposite ends downwardly extending flaps 5 and along its rear edge another flap 6 so that when this indicator is placed on the keyboard the flap 6 is behind the rear ends of the black keys and the flaps 5 are at the sides of two black keys 7 so that these flaps hold the indicator in position. These flaps 5 are preferably long enough to extend down into the space between the black keys 7 and the adjacent white keys.

The chart 8 to be used with this indicator as indicated in Figs. 4, 5 and 6 which is the preferred form for beginners, but may be modified as will later be described, may be printed on cardboard or paper and is laid out in a series of vertical and horizontal rows of squares of equal width by the vertical and horizontal faint or light lines 9 and 10. In Fig. 4 is shown a simple piece which is played on three different keys of the piano and this is indicated by coloring the squares in a horizontal row to correspond with the proper notes of this piece. That indicated is composed of a series of squares indicated by reference characters 11 to 18. The first two squares 11 and 12 are the same note and they therefore are colored the same color which in the present illustration is red to correspond with the left hand panel 3 of the indicator 1 which as shown in Fig. 1 is over the note C on the piano keyboard. The heavy line 19 denotes that the key is to be pressed twice in succession, that is the key is to be depressed for each of the squares 11 and 12. The next two squares 13 and 14 are colored yellow in this illustration corresponding to the panel 20 in the indicator 1 and the black line 21 shows that this note is to be played twice in succession which is the note E of the scale. The next two squares 15 and 16 are colored orange to correspond with the color of the panel 22 of the indicator which is the key corresponding to the note D of the scale, and as the blocks 15 and 16 are separated by a heavy black line 23 this note is also to be played twice in succession. However, the next two squares 17 and 18 which are colored red the same as squares 11 and 12 are not separated by a heavier line and thus indicates that the note corresponding to these two squares is to be played as a single note but twice the length of the notes indicated by the other squares. Thus if the notes indicated by the squares from 11 to 16 are taken as quarter notes then the note indicated by the two squares 17 and 18 will be twice this length, or a half note. Therefore it will be seen that in playing this short piece all the pupil has to do is to play the keys on the piano keyboard opposite the panels 2 which correspond to or have the same color as the various blocks 11 to 18.

A somewhat more comprehensive piece is illustrated in Fig. 5 where the colored squares are indicated by reference characters 24 to 35 inclusive. The first square 24 is colored yellow to correspond with the panel 20 of the indicator and shows the key where note E is to be played. Squares 25 and 26 are colored red corresponding to panel 3, but as they are not separated by a heavy line it indicates that they are to be played as a single note of twice the length of the note for the square 24. Square 27 is the same as square 24, and squares 28 and 29 are the same as 25 and 26. Square 30 is the same as 24 and 27, and 31 and 32 are the same as 25 and 26 or 28 and 29. The squares 33, 34 and 35, however, are colored blue to correspond with the panel 36 of the indicator. However, as 33 and 34 are separated by a heavy line 37 this key will be depressed twice for the blocks 33 and 34, but as 34 and 35 are not separated by a heavy line they will be played as one note of twice the length of the block 35.

The same system is carried out in the piece shown in Fig. 6 which is still more elaborate and of greater length than that of Fig. 5 and is carried over into two lines of squares indicated by reference numerals 38 to 53. The first square 38 is violet red to correspond with the panel 54 of the indicator located over the note B of the scale. The next two squares 39 and 40 are colored blue violet to correspond with panel 55. The next two squares 41 and 42 are colored blue to correspond with the panel 36 while square 43 is green to correspond with panel 56 of the indicator. Squares 44 and 45 are blue, 46 violet red, 47 blue violet, 48 blue, 49 green, 50 and 51 blue violet, and 52 and 53 blue and are to be played by the keys corresponding with the similarly colored panels in the indicator. It will be seen that in this piece the notes corresponding to the squares 44 and 45; 50 and 51; and 52 and 53 are to be played as half notes, while the others are to be played as quarter notes since they are separated by the heavy vertical line.

When the pupil has become further advanced the chart squares may have the actual note indicated therein, thus in Figs. 7 to 11 inclusive the one square of Fig. 7 as it indicates a quarter note may have the quarter note 57 printed in this square, the square being colored the same as in Figs. 4 to 6 to indicate through the indicator 1 the key to be played. The squares of Figs. 7 to 11 are lined for red to indicate the key C but this of course is merely by way of example. In Fig. 8 two consecutive squares indicate twice the length of one square, or that is, a half note, which may be printed in the center of these two squares. In Fig. 9 the three consecutive squares indicate a dotted half note which may be printed as indicated at 59 in the intermediate of these three squares. In Fig. 10 four consecutive squares indicate a whole note which may be printed in these squares as indicated at 60. In Fig. 11 is shown how notes of less length may be indicated. Thus a square may be divided by a dotted line 61 to show it is to be played as two eighth notes and these may be printed as such in the half squares as shown at 62. If they are to indicate sixteenths or shorter notes they may be divided and printed in a similar manner.

In Figs. 12, 13 and 14 is shown how it may be indicated that the note is to be played in a higher or lower octave than the middle octave. Thus as shown in Fig. 12 a heavy line 63 over the square indicates that the note is to be played an octave higher, or if two such lines are over the note it indicates two octaves higher. Similarly in Fig. 13 a heavy line below the square indicates it is to be played an octave lower, while two such heavy lines as indicated in Fig. 14 indicates it is to be played two octaves lower.

Figure 16:
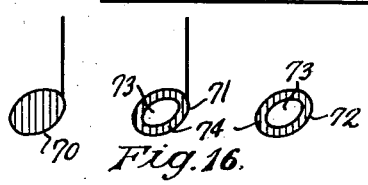
Fig. 16 shows how different values of notes may be indicated with the color arrangement employed.

As indicated above the colored symbols or indications need not be blocks or squares, or even rectangular or rectangular panels, but may be of other shapes as desired. In Fig. 15 is shown how these colored symbols or indications may take the shape of the musical notes themselves and printed on the standard musical staff. They may be colored to indicate the proper keys on the piano keyboard and large enough so that the colors are easily distinguished. Thus the notes 64 may be colored to correspond with the indication for the note E on the indicator used on the keyboard 65 colored for the key F, 66 for the key A, etc. These also indicate quarter notes in the usual way, but when a half note is indicated as at 67, 68 and 69 the note is open in the center to indicate that it is a half note as is brought out in connection with Fig. 16 where 70 indicates a quarter note, 71 a half note and 72 a whole note, the outline notes such as the half and whole notes being left open or uncolored in the center as indicated at 73 surrounded by a band 74 of the proper indicating color. In Fig. 15 the half notes 68 and 69 are dotted half notes and can be so indicated in the usual manner. Under note 68 are the double bars 75 indicating this note is to be played two octaves lower than indicated. Also, the bar 76 under note 69 indicates that that is to be played one octave lower.

Figure 17:
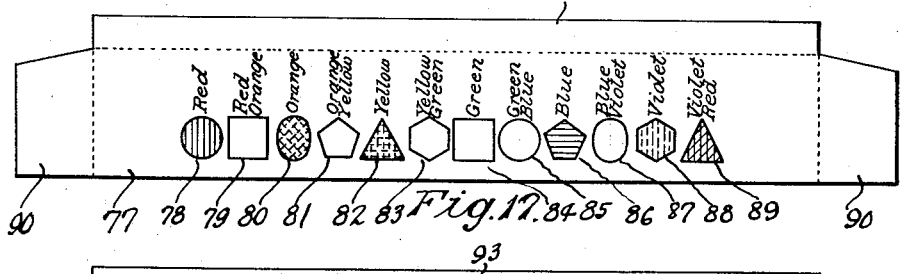
Fig. 17 shows another system of indication which may be used to designate the various notes.

In Fig. 17 is shown another way the symbols may be varied. This shows an indicator 77 corresponding to the indicator 1, but instead of using the elongated panels 2 as in the first form these may take different shapes as indicated. Thus the red and green blue indications 78 and 85 may be circles, the red orange and green 79 and 84 may be squares, the orange and blue violet 80 and 87 may be oval shaped, the orange yellow and blue 81 and 86 may be pentagons, the yellow and violet red 82 and 89 may be triangles, and the yellow green and violet 83 and 88 may be hexagons, or other shapes may be employed as desired. In such cases the distinctive shapes with the various colors used help to identify the various notes. This indicator may be used the same as indicator 1 on the keyboard as shown in Fig. 1 with downwardly extending flaps 90 at the opposite ends being used the same as the flaps 5 in the first form, and having a flap 91 along its rear edge to be used the same as the flap 6 of the first form.

Figure 18:
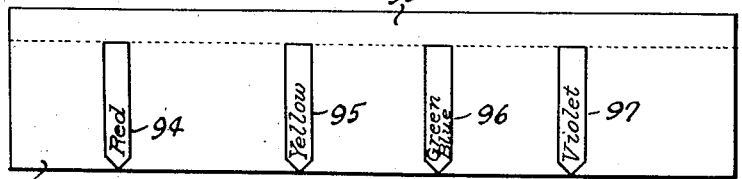
Fig. 18 is an example showing how chords may be indicated.

In Fig. 18 is shown an indicator 92 which may be used to indicate chords, this being used similar to the indicators 1 and 77 by placing on top of the keys of the piano keyboard at the rear part of the keyboard. This has a downwardly extending flap 93 along its rear edge to extend back of the rear ends of the black keys to hold it in position, and colored panels 94 to 97 so spaced and colored as to indicate the proper keys to give the proper notes of the chords.

Figure 19:
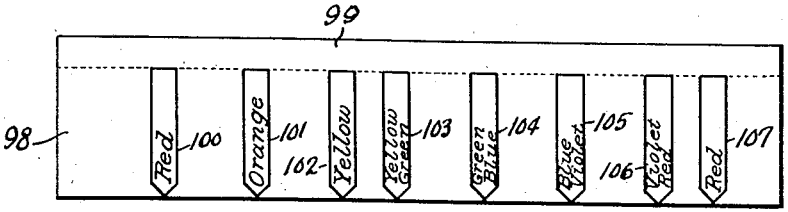
Fig. 19 is another example showing how a major or other scale may be indicated.

In Fig. 19 is shown a similar indicator 98 to be used in the same way on the keyboard and having a downwardly extending flap 99 along its rear edge and having colored indicators 100 to 107 properly spaced and colored to indicate any desired scale, the one indicated being a major scale. It will of course be understood that these indicators can be so arranged that any chords or scales may be similarly indicated. It will be seen that the scales or chords are very easily understood and practiced with corresponding colors indicating the particular scale or chord. By moving the indicator to the right or left on the keyboard to other positions the pupil will get all scales and chords in the different keys.

This apparatus and system is more interesting and pleasing to the pupils, and they consider it more in the nature of a game rather than as a lesson, it being used in the nature of a game of matching the colors and tones and gives them an independent, firm, natural knowledge of music: tone, rhythm, harmony, knowledge of the piano keyboard, notes, etc. With this system and apparatus the child is more apt to retain its interest until it is old enough to actually learn to read music and study it in the normal manner. It will be seen from the above that it can be used progressively working from the most simple gradually to the more difficult music. Very young children can pick out different notes by matching different colors where they would not be sufficiently developed to read music in the ordinary manner. Therefore, it can be used successfully for very young children as well as for older children, and even for adults beginning the study of music. It has a stimulating effect on the children because they learn something by their own effort alone and practically without outside help or compulsion. Learning to play the piano becomes a pleasure and recreation instead of a hardship and duty. This method and apparatus makes it possible for children to become advanced and develop a taste for music by the time they reach the age when piano instruction usually begins. Adults who do not have the necessary time or desire to take lessons in the usual manner can use this method and learn to play with remarkable ease and rapidity, even if they devote only a short time a day to playing the piano.

Instead of the colored indicators 2 on member 1 or 78 to 89 on member 77 being mounted on a separate member to be placed on top of the keys, these indicators can be cut from pieces of paper, cardboard or other material and pasted or otherwise secured to the proper keys as shown at 108 in Fig. 1, or the two can be used together, or the keys themselves can be painted the proper colors, or these indicating symbols can be painted on the keys.

The essence of this system is that the pupil in learning music and piano playing operates exclusively on its natural ability to distinguish the colors and different spacial proportions or lengths. Thus with this system the child's subconscious mind photographs all new conventional material of instruction which is being illustrated and introduced through natural knowledge of color and space.

This system and apparatus has been described in connection with a piano keyboard merely as a more specific example or illustration, but they are applicable to use with practically any musical instrument, including the xylophone and so forth, the principle being the same in all cases.

Having thus set forth the nature of my invention, what I claim is:

1. In an apparatus for piano instruction an indicator comprising an elongated card having transversely extending differently colored bars positioned to correspond with the relative positions of different keys of a piano keyboard, and downwardly extending flaps at the ends and rear edge of said card to cooperate with the sides and rear ends respectively of black keys of a piano keyboard to locate said card adjacent said keyboard with said bars in alignment with different keys to indicate said keys by the respective colors.

2. In an apparatus for piano instruction an indicator comprising an elongated card having a plurality of differently colored indications positioned to lie in alignment with a plurality of the consecutive keys of the keyboard to indicate said keys by the respective colors and arranged in the order of the colors of the natural spectrum, and downwardly extending means at the ends and rear edge of said card to cooperate with the sides and rear ends respectively of black keys of a piano keyboard to locate said card adjacent said keyboard with said bars in alignment with different keys to indicate said keys by the respective colors.

BORIS M. LANG.